(12) United States Patent
Juncker et al.

(10) Patent No.: US 11,604,698 B2
(45) Date of Patent: Mar. 14, 2023

(54) METHOD AND PROCESS FOR AUTOMATIC DETERMINATION OF FILE/OBJECT VALUE USING META-INFORMATION

(71) Applicant: Code42 Software, Inc., Minneapolis, MN (US)

(72) Inventors: Robert Juncker, Lakeville, MN (US); Thomas Anthony Lindquist, Minnetonka, MN (US); Michael Woodfill, Eden Prairie, MN (US); Adam Nave, Lauderdale, MN (US)

(73) Assignee: Code42 Software, Inc., Minneapolis, MN (US)

( * ) Notice: Subject to any disclaimer, the term of this patent is extended or adjusted under 35 U.S.C. 154(b) by 105 days.

(21) Appl. No.: 17/109,727

(22) Filed: Dec. 2, 2020

(65) Prior Publication Data

US 2022/0171678 A1 Jun. 2, 2022

(51) Int. Cl.
*G06F 11/14* (2006.01)
*G06F 16/182* (2019.01)
*G06F 16/14* (2019.01)

(52) U.S. Cl.
CPC ...... *G06F 11/1435* (2013.01); *G06F 11/1451* (2013.01); *G06F 11/1464* (2013.01); *G06F 11/1469* (2013.01); *G06F 16/148* (2019.01); *G06F 16/156* (2019.01); *G06F 16/1824* (2019.01)

(58) Field of Classification Search
None
See application file for complete search history.

(56) References Cited

U.S. PATENT DOCUMENTS

| | | | |
|---|---|---|---|
| 9,298,576 B2* | 3/2016 | Ghemawat | G06F 11/3024 |
| 2014/0025810 A1* | 1/2014 | Ghemawat | G06F 11/3466 709/224 |
| 2016/0062954 A1* | 3/2016 | Ruff | G06F 40/205 715/249 |
| 2016/0092465 A1* | 3/2016 | Dornquast | G06F 21/552 706/12 |
| 2019/0146875 A1* | 5/2019 | Harrington | G06F 3/0632 714/6.24 |

* cited by examiner

*Primary Examiner* — Kim T Nguyen
(74) *Attorney, Agent, or Firm* — Schwegman Lundberg & Woessner, P.A.

(57) ABSTRACT

A system for processing a file stored on a computing system includes causing a processor of the system to obtain file usage data that is indicative of a number of times the file is loaded into a memory of the system and to obtain file-size data that is indicative of a size the file. The system further includes causing the processor to obtain metadata indicative of contents the file and to determine a file value based on the file usage data and at least one of the file-size data, the metadata, or a file-identifier value that is derived from an identifier of the file, where the file value comprising a quantitative or qualitative indicator of a value of the file. The system additionally includes causing the processor to adjust processing of the file relative to processing of other files associated with the computing system based on the file value.

18 Claims, 10 Drawing Sheets

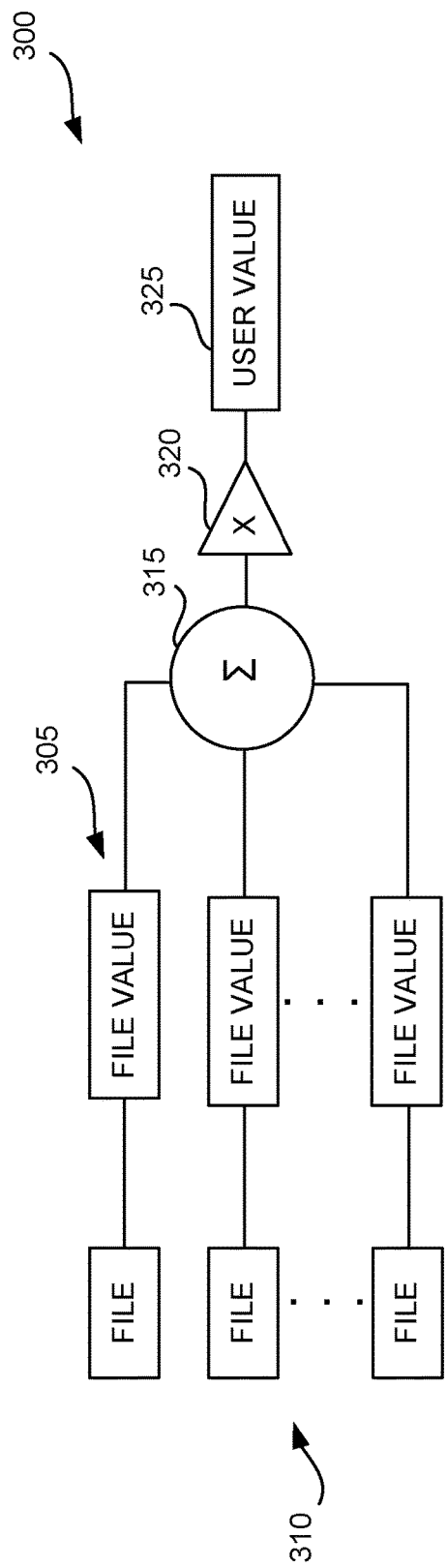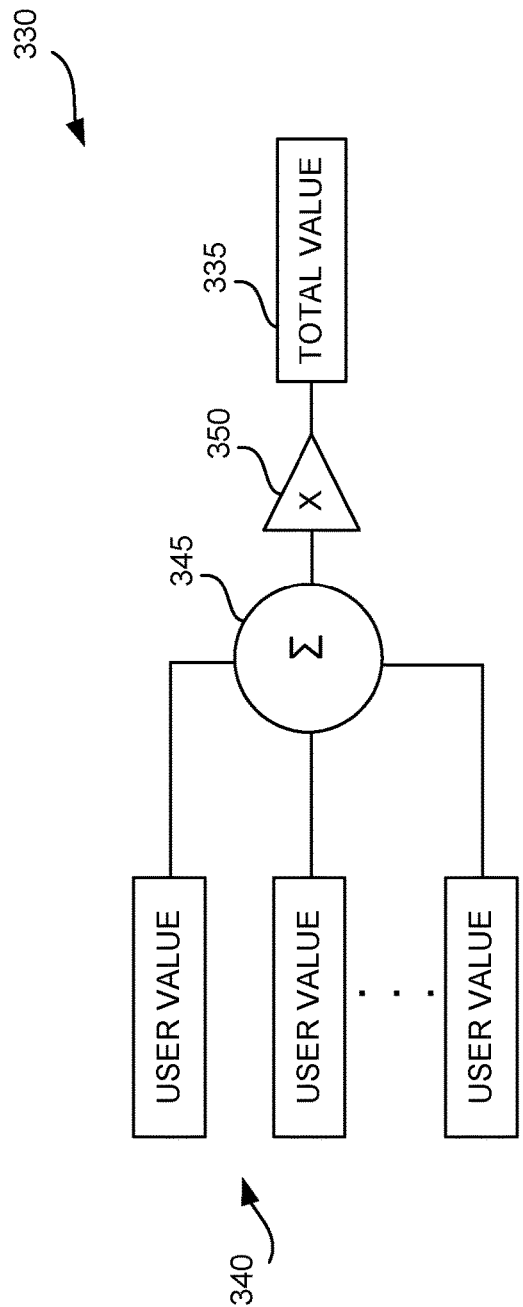
FIG. 3A
FIG. 3B

METHOD AND PROCESS FOR AUTOMATIC DETERMINATION OF FILE/OBJECT VALUE USING META-INFORMATION

TECHNICAL FIELD

Embodiments of the present disclosure relate generally to computer data storage, more particularly, but not by way of limitation, to determination of a file or filesystem object value using meta-information.

BACKGROUND

Corporations, firms, business entities, and other institutions (hereinafter, "organizations") can generate or manage large volumes of a data and other intellectual property resources during the course of their operation. This structured or unstructured data is typically stored one or more computing systems in large collections of files, binary large objects (BLOBS), or other data storage objects (hereinafter collectively, "files" or "filesystem objects"). Organizations can invest considerable computing resources to processing, preserving, and making available, the collection of files under their control. In an example, organizations can protect their files from loss caused by system failures or negligent use by dedicating computing resources on each computing device that can access these files for locally or remotely backing up these files. In the event of file damage or data loss, additional resources are allocated to retrieve and restore backed up copies of the damaged or lost files without any data loss.

BRIEF DESCRIPTION OF THE DRAWINGS

Various ones of the appended drawings merely illustrate example embodiments of the present disclosure and cannot be considered as limiting its scope. Additionally, the headings provided herein are merely for convenience and do not necessarily affect the scope or meaning of the terms used.

FIG. 3A illustrates a diagram of a component for determining the cumulative value of data that is associated with a user, according to an example of the present disclosure.

FIG. 3B illustrates a diagram of a component for determining the cumulative value of data at an organization, according to an example of the present disclosure.

DETAILED DESCRIPTION

Figure 1:
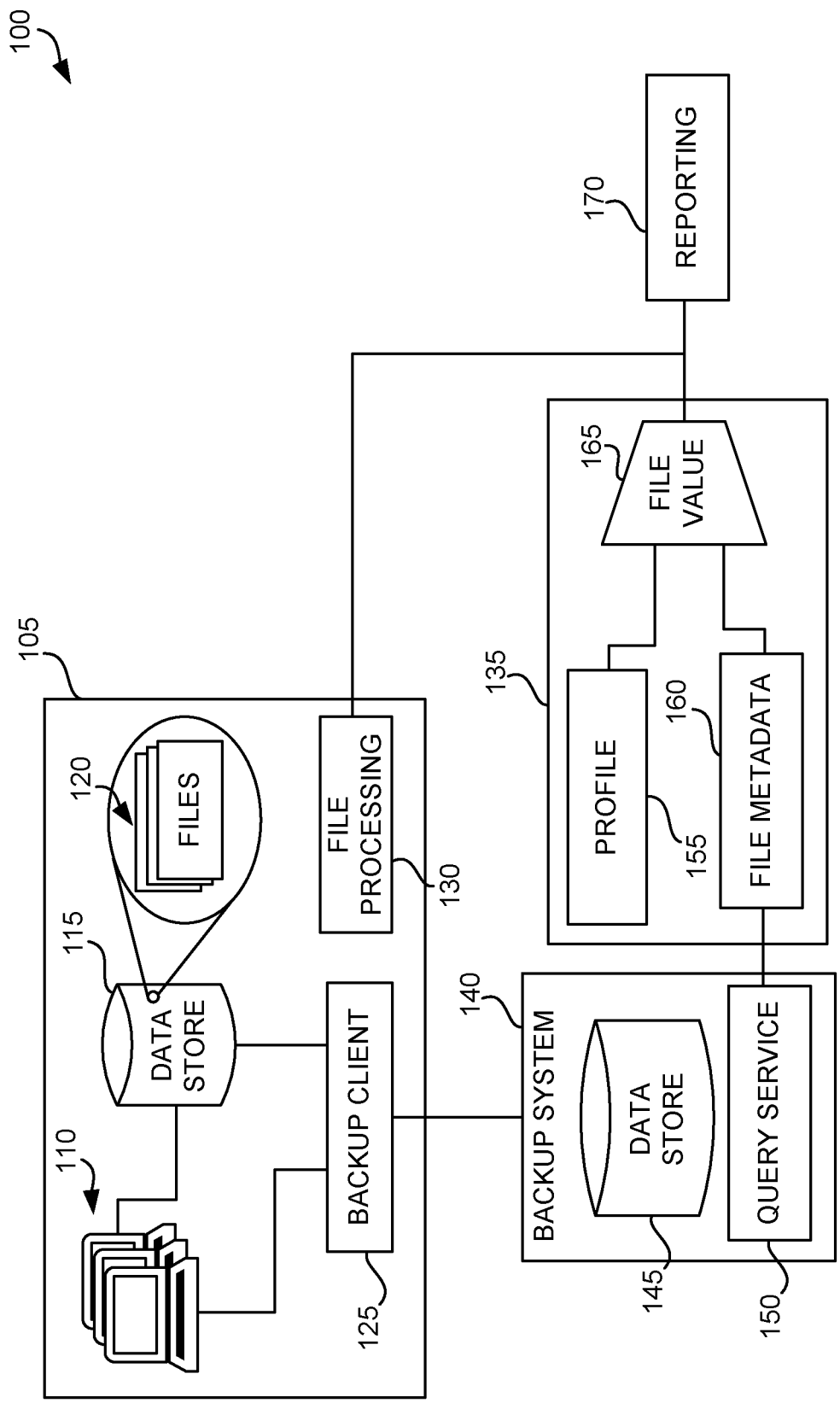
FIG. 1 illustrates a diagram of a system for automated determination of a file value of a file, according to an example of the present disclosure.

Processing the large collections of files generated or managed by an organization be expensive in terms of computing resources, time, security, and business efficiency. In an example, file backup and restore systems use processing resources to process file repositories to identify files to be backed up, changes in files that have already been backed up, data communication resources to transfer files to or to retrieve files from remote backup systems, and physical data storage resources to store the backed-up files. In another example, the computing resource of an organization can take a considerable amount of time or computing resources, to process the files managed by the organization. In some situations, such as during an emergency file backup operation due an eminent computing device failure, an organization may lose valuable (e.g., important) data if there isn't sufficient time to process all the available files. In yet another example, organizations typically engage data security personnel to monitor and analyze potential file exfiltration activities. The costs of engaging such personnel can be considerable for organizations that manage large collections of files or for organizations that experience high volumes of file access activities. In addition to the foregoing, efficiencies in an organization can be attained by developing an understanding of how data-based intellectual property assets are generated, accessed, or otherwise distributed amongst personnel of an organization. It can be difficult or expensive for organizations that manage large file repositories to develop such understandings, and such organizations may therefore not obtain the benefits of the attendant efficiencies.

The discussed costs associated with managing large file repositories can be caused by, or may be associated with, the fact that existing techniques for processing the large collections of files that are housed in these repositories do not include automated techniques for determining, or assigning, a value (e.g., a monetary, intellectual, or utilitarian value) to these files. In an example, file backup systems can provide file processing statistics, such as 188 gigabytes of files or data has been backed-up, or 9,000 files out of total of 10,000 are backed-up. These statistics, however, do not provide enough information enable personnel or software applications to understand, or to make intelligent decisions regarding, the value of data that has already been processed (e.g., backed-up) or that is still exposed.

Automated processing of files at an organization is typically performed without much consideration to the value of data contained in, or associated with, those files. One reason for this is that the large quantity of files that are generated by organization can make existing manual techniques for assigning a value to file either prohibitively expensive and time consuming. Such techniques can also be too coarse grained (e.g., assigning a value to a file just based on its file type) to be meaningful or to attain any of the benefits described herein.

Examples of the present disclosure are based on the inventors' recognition of a need for automated techniques for determining the value of data generated or managed by an organization, such as by automatically determining a value for each individual file that contains such data. Such information can improve the usage, storage, allocation, or processing (hereinafter collectively, "processing") files at an organization. In an example, this information can be used to assign a monetary value to each file repository or file archive associated an organization or personnel engaged by the organization. This monetary value, or another associated value, can then be used to determine an allocation of computing or personnel resources for processing the repositories or the files contained therein. In a more specific example, the monetary value can be used to generate information, such as statistics, that can be used to identify personnel who generate the most value at an organization, thereby informing considerations of how to allocate resources to protecting data that is associated with such personnel. In another example, an organization can use automatically generated information regarding the value of a file to determine areas within an organization where innovation is occurring and thereby inform the allocation of resources (e.g., computing resources) to such areas.

In addition to the foregoing, an organization can use automatically generated information that is indicative of the value of a file to determine which files to backup, such as during an emergency where time and computing resources are limited. An organization can also use such information to determine the value of a collection of ideas protected (e.g., such as by backup systems or data security personnel) by the organization. An organization can also use such information to determine the risk associated with a file leaving a digital perimeter of an organization. An organization can also use such information to identify personnel who are generating the most valuable ideas or to determine whether the most valuable ideas are currently protected. An organization can further use such information to identify personnel or computing resources that store the most valuable ideas or to generate information regarding the safety of such personnel or computing resources, such as by identifying the personnel or the computing resources associated with such personnel that possess data having a lot value but may not be adequately protecting such data. Such insights can then be used to adjust data protection polices directed at such personnel or associated computing resources, ensuring that their digital/data property is safer than someone who might not be generating as much value.

Examples of the present disclosure are based on the realization that file system event data that is collected by some data backup systems, such as the forensic file system discussed in U.S. patent application Ser. No. 16/360,273, which is titled "FORENSIC FILE SERVICE" and is hereby incorporated by reference, can be used to enhance file processing at an organization, such as by enabling the automated determination of file values of files at the organization. The file system event data (hereinafter, "event data") includes any data that is indicative of, or associated with, a data access event. A data access event includes one or more operations executed by a computing resource to access, process, or handle a file. In an example, a data access event includes operations to transfer a data object (e.g., a file, archive, populated data structure, or other data object) to a removable storage device, a remote storage location (e.g., a cloud based storage), a personal email account, or other remote computing resource. In another example, a data access event includes operations to read, modify, copy, or delete selected files. The data access events an include, or may be used to generate, metadata associated with a file. Such metadata can include information regarding the number of times a files is read, the number of times a file changes or is modified, the size of the file, the file type of the file, or the file name of the file. In some examples, such metadata is obtained from an operating system, a file system, a file backup system, a file repository, or any other suitable source.

In an example, the file value of a file (or the value of preserving or processing the file) is determined based on a set of metadata or meta-information associated with the file. Determining the file value of the file can include determining a suitable technique for attributing each component or element of the set of metadata to the file value. In an example, such determining include obtaining suitable analytical or numeric model (hereinafter collectively, "model") with associated weights for capturing the interaction of, and combining, a numeric value associated with each component of the metadata to generate the file value of the file. In an example, a model for determining a file value of a file is shown in equation (1) as, $$\text{File value} = A_C \times T \times (R \times C) + S_C \times T(F_S) + C_C \times T(F_N) \qquad (1).$$

In equation (1), the terms R, C, $F_S$, T, and $F_N$, are, respectively, the number of times the file is read, the number of times a file changes or is modified, the size of the file, the file type of the file, and the name of the file. The coefficients $A_C$, $S_C$, and $C_C$, are, respectively, an access coefficient, a size coefficient, and a content coefficient, each of which may be provided by an organization or learned for an organization using machine learning techniques. The number times that a file is read can be indicative of user or personnel need for the file or for the data contained therein. Such need can be indicative of the value of the file, such that the more frequently a file is accessed, the more valuable the file. The number times that a file changes, such as being modified or updated, can be indicative of file value as personnel is likely updating the file to add value. The file size term can be correlated with the file value of the file as large files tend to contain or store more valuable information relative to smaller files. The file type term can include a value assigned to a file of a given type. This value can be learned, such as by using machine learning techniques, or may be assigned by an organization such that a large value is assigned to types of files that are more likely to contain an idea or other valuable data than file types. In an example, log files (e.g., ".log" files) tend not to include ideas and therefore tend to have a small file type value (e.g., T=0). In another example, engineering files, such as computer aided drawing (CAD) files, tend to have intrinsic value or are a likely to contain valuable ideas and there can be assigned a large file type value (e.g., T=1). The file name ($F_N$) term can include a numeric value that is indicative of the number of keywords in the name of a file. Such keywords can be provided by an organization or learned using machine learning techniques. Such keywords can include words that tend to affect, or be indicative of, the value of a file. In an example, words like "Board of Directors", "Financial Statement", or "Revenue" in a filename can be indicative of a value of the associated file.

Examples of the present disclosure include techniques (e.g., processes, systems, devices, or non-transient machine-readable storage mediums) for automated determination of the file value of one or more files and adjusting processing of such files based on the file value. Such techniques include obtaining metadata that is indicative of the value of each file. Such metadata can include information that is indicative of the number of times a file is read, the number of times a file changes or is modified, the size of the file, the file type of a file, and the name of a file (e.g., keywords included in the file name). Such techniques also include obtaining a model and a set of weights or scaling coefficients for using the metadata to determine the file value of a file. Such techniques can additionally include using the metadata, the model, and coefficients to determine the value of the files.

Examples of the present disclosure include techniques for adjusting the processing of a set of files based on the value of each file in the set of files. In an example, the technique for determining a value for each file and for generating a priority or ranked schedule for processing each file based their relative file values. In an example, the techniques include generating a priority schedule that determines the order in which each file associated with a computing resource is backed-up by a backup system, such that where the order in which the files are backed-up is determined by the file value of each file. In another example, the techniques include generating a security policy for determining, based on a of the value of a file, when a security system should generate a security alter in response to a detected access to, or exfiltration of, the file. In another example, the techniques include automatically determining processing policy (e.g., a file backup policy) for a file based on the file value of the file. In an example, such policy includes determine whether to include or exclude a file from a backup process.

The terms "computing resource" and "computing system" are used interchangeably in the descriptions and definitions provided herein.

Turning now to the figures, FIG. 1 illustrates a diagram of a system 100 for automated determination of file value, according to an example of the present disclosure. In example, the system 100 includes an implementation of one or more of the described techniques for automated determination of file value for a file and for adjusting the processing of the file, or other associated files, based on the file value. The system 100 can include computing resources of an organization 105, a backup system 140, file value determination component 135, and a reporting component 170. Components of the system 100 can communicate through a data communication network or any other suitable data communication channel.

The resources of the organization 105 can include any suitable computing resource for generating or managing files (e.g., creating, modifying, deleting, reading, or processing) or file repositories. Such computing recourses can include an endpoint device, a computing server, or network-based or hosted computing environment. Such computing resources can include a computing environment, or a partition of a computing environment, that is allocated to an organization or to a user of computing system. In an example, the computing resources include a cloud computing environment or a cloud-based file storage environment, such as a cloud or internet based file storage or synchronization service, the enables remote storage or other access of files and digital content. In an example, such computing resources include personnel computing resource 110, data store 115, backup client 125, and file processing component 130.

Personnel computing resource 110 can any computing resource (e.g., a computing resource of an organization), computing system, computing environment (e.g., a hosted computing environment), or partition of a computing environment, that is allocated to a user of the computing resource. In an example, the personnel computing resource 110 is used by an organization or by an associate of an organization, such as an employee or client, to execute one or more tasks on the behalf of the organization. In an example, the personnel computing resource 110 is configured with one or more software application, such as the backup client 125, to capture file access events and provide event data corresponding to the file access events to the storage system 140.

Backup client 125 can include any software application that is configured to process or backup files, such as files 120 stored in data store 115. In an example, the backup client 125 is configured to capture file access event and associated metadata, such as described in patent application Ser. No. 16/360,273. In another example, the backup client 125 is configured to obtain metadata for the files 120, or any other files accessible to the computing resource 110, and to provide such metadata to the backup system 140. In an example, such metadata includes information regarding the number of times a files is read, the number of times a file changes or is modified, the size of the files, the file types of the files, or the file names of the files, as described herein. Such metadata can be obtained by automated monitoring of file access events that are associated an application executing on the computing resource 110 accessing one or more of the files 120.

File processing component 130 can include any software application that is configured to process or schedule the processing of the files 120. In an example, the processing component 130 is configured to automatically execute operations that create, read, write, delete the files 120 based on a determined file value of the files. In another example, the processing component 130 is configured to automatically determine a backup or security reporting policy for the files 120 based on the determined file value of the files.

The backup system 140 includes any system that is configured to interface with the backup client 125 to receive event data, file metadata, and file backup data from the organization 105. Such data can be stored in the data store 145 and accessed through query service 150, such as described in U.S. patent application Ser. No. 16/360,273.

The file value determination component 135 can include any system or software application that is configured to determine the value of a file based on metadata associated with the file. The file value determination component 135 can include profile component 155, metadata component 160 and file value component 165. In an example, the profile component 155 is configured to determine scaling or filter values for file metadata obtained from the backup system 140. In an example, the profile component 155 is configured to provide or obtain the values of the model coefficients $A_C$, $S_C$, and $C_C$. In an example, one or more of the scaling or filter values or the model coefficients can be obtained from the organization 105 or from a machine learning application that is configured to determine such values. The file metadata component 160 can be configured to interface with the query service 150 and obtain metadata for determining the value of a file, as described herein. Such metadata can include information that is indicative of the number of times the file is read, the number of times a file is changed or is modified, the size of the file, the file type of the file, and the name of the file, as described herein. Such interfacing can include generating a database query in any suitable query language that is supported by the query service 150 and transmitting the query, such as over a data communication network, to the query service. Such interfacing an also include receiving a data structure, such as one or more data packets over the data communication network, that includes the requested metadata.

The file value component 165 can include any suitable processing component that is configured to determine a file value for a file based on the scaling and coefficient information provided by profile component 155 and the metadata obtained by file metadata component 160. In an example, the processing component includes a circuit or software application that implements the model described in equation (1) and is configured or actuated by the coefficient information and the metadata to generate the file value according to the model.

The file value component 165 an generate a numeric file value that is indicative of the value of a file. In an example, the numeric file value is monetary value, such as $5,000. In another example, the numeric file value is a normalized value between 0 and 1, such that a 0 is indicative of a file having a low value and a 1 is indicative of a file having a high value. The file value component 165 can provide the numeric value to a reporting component 170 or to the file processing component 130.

The reporting component 170 can include a circuit of software application that is configured to provide an indication of the file value of the files 120 to the organization 105. In an example, the reporting component is a component of the backup client 125 and is configured to provide statistical or other summary information regarding the value of files that are backed-up, pending backup, or excluded from backup. In another example, the reporting component 170 can be a component of the file processing component 130 and is configured to provide statistical or other summary information regarding value of files that are processed, scheduled to be processed, or excluded from processing.

In an example operation, the backup client 125 (or a file value component of the backup client) monitors personnel interaction with files of the computing resource 110, the data store 115, or any other data repository associated with the organization 105. The backup client 125 detects file interaction operations, such as operations to read, modify, or create files. The backup client 125 captures information associated with these interactions (e.g., the time of the interactions, the personnel initiating the interaction, or the files associated with the interactions), as well as metadata associated with the files involved and transmits this information to the backup system 140. The file value determination component 135 queries the backup system 140 to receive file metadata for one or more of the files 120. The file value determination component 135 uses this metadata along with model data obtained from the organization 105 though profile component 155 to determine the file values of the one or more files 120. The determined file values of these files can be stored in a database on any suitable computing system, such as in the backup system 140 or in one or more computing resource of the organization 105. During a file processing operations, such as a file backup operation executed by the backup client 125 or a batch or automatic file processing operation executed by file processing component 130, the file values are accessed and used to adjust the file processing of one or more files based on their respective file values. The file values are also be accessed to generate statistical or other summary information regarding the processing.

Figure 2:
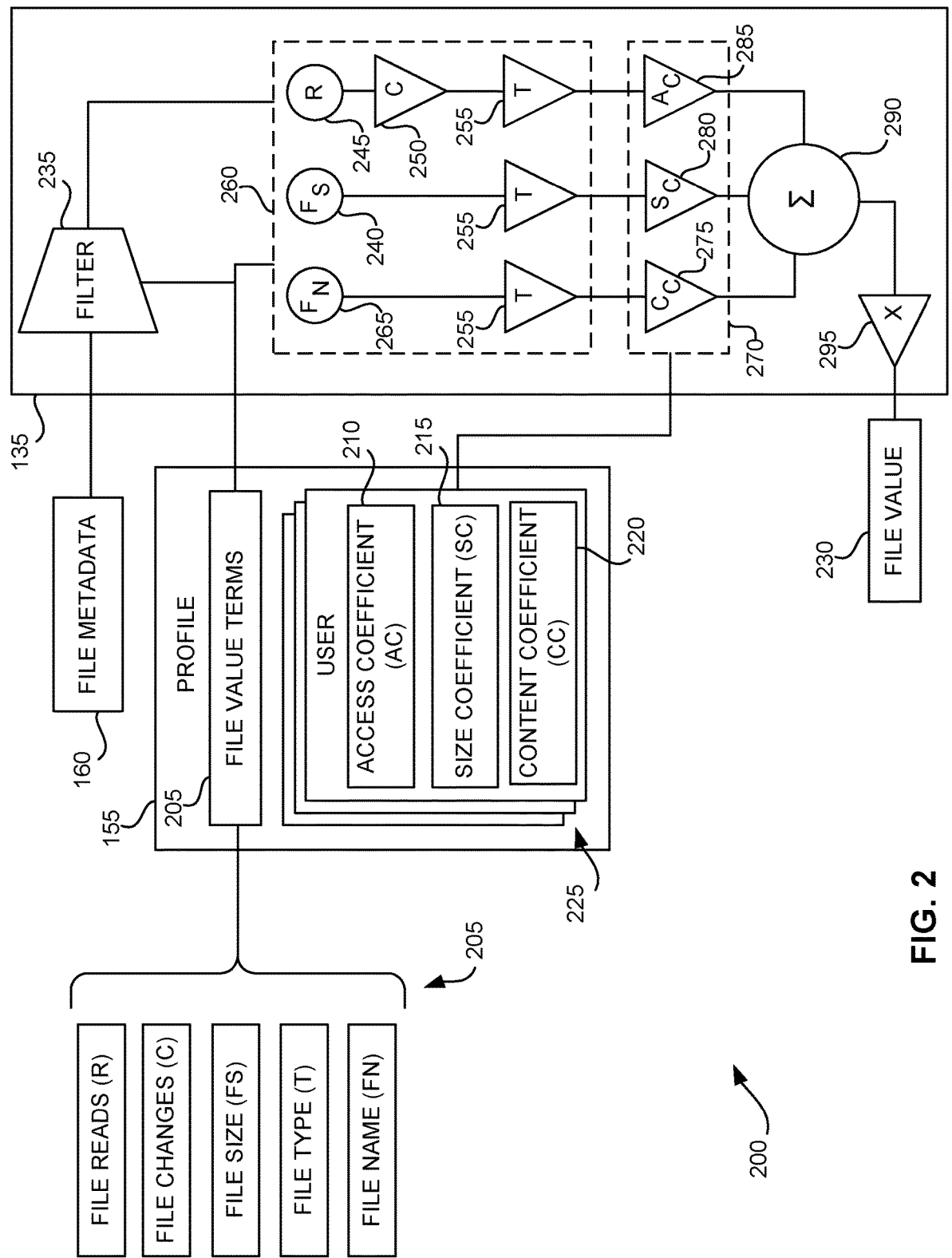
FIG. 2 illustrates a diagram of a processing component for determining a file value of a file, according to an example of the present disclosure.

FIG. 2 illustrates a diagram of a processing component 200, such as file value determination component 135, for determining the file value of a file, according to an example of the present disclosure. The processing component 200 include a circuit or a software application that is configured to periodically, or responsive to an event (e.g., a scheduled time, or a file access event) or a request received from a computing resource of an operator, determine the value of one or more files in a file repository, such as files 120 in the data store 115 or files in the data store 145. The processing component 200 includes the file value component 135, profile component 155, and meta data component 160, such as described in the discussion of FIG. 1.

The profile component 155 can include file value terms 205 and one or more sets of model parameters, such as access coefficient ($A_C$) 210, size coefficient ($S_C$) 215, and content coefficient ($C_C$) 220. In an example, the file value terms 205 can include organization specific formatting or normalization information that can be used by the processing component 200 or the file value component 135 to normalize, scale, filter, or otherwise condition the file metadata obtained the backup system 140 by the file metadata component 160. In an example the file value terms component 205 can include data that is usable to configure the file value component 135 to filter or exclude one or more components (e.g., File Names) of the file metadata, such as for organizations for whom such components are not useful for determining file value. In an example, filtering or excluding a component of metadata can include assigning the component a zero or a unity value. The model parameters can include one or more data structures comprising numeric values for $A_C$ 210, $S_C$ 215, or $C_C$ 220. In an example, the numeric values can be a decimal between zero and one, such as to represent a percentage of the overall file value that is attributable to file value terms or file metadata components that are associated with or multiplied by the coefficient. In an example, the numeric values for $A_C$ 210, $S_C$ 215, or $C_C$ 220 can be 0.2, 0.3, and 0.5, respectively. In certain examples, the profile component can include different numeric values $A_C$ 210, $S_C$ 215, or $C_C$ 220 for each organization or different groups of one or more personnel within an organization.

The file value component 135 can include a filter component 235, model term component 260, model parameter component 270, summing component 290, and scaling component 295. The filter component obtains file metadata from file metadata component 160 and filters, formats, or conditions the metadata according to information obtained from file value terms component 205 to generate a set of model terms R, C, $F_S$, T, and $F_N$. The model terms R, C, $F_S$, T, and $F_N$ correspond, respectively, to the number of times a files is read, the number of times a file changes or is modified, the size of the file, the file type of the file, or the file name of the file. The model term component 260 applies the values of the model terms $F_N$, $F_S$, R, C and T to input components 265, 240, 245, and scaling component 250, and 255 respectively. In an example, the input components 265, 240, 245 include one or more registers, variable or other storage units. In an example, the scaling component 250 and 255 include one or more circuits, operators, or software function that are configured to receive input data and to scale (e.g., multiply) the input data by a numeric value, such T. Model parameter component 270 scales the output of model the model term component 260 by the values of $A_C$ 210, $S_C$ 215, and $C_C$ 220 using scaling components 275, 280, and 285, respectively. The summing component 290 sums the output of scaling components 275, 280, and 285 to produce an intermediate file value. The intermediate file value can be scaled by scaling component 295 to generate an output file value 230. In some examples, the scaling component 295 is omitted or is a unity scaler.

FIG. 3A illustrates a diagram of a component 300 for determining the cumulative value 325 of data that is associated with a user, according to an example of the present disclosure. As shown in FIG. 3A, the cumulative value 325 of data associated with a user can be determined by summing (e.g., using summing component 315) the file value 305 of each file 310 associated with the user, and scaling the sum using scaling component 320. In some examples the scaling component 320 can be omitted or may have a unity scaling value. The cumulative value 325 can provide an indication of the total value of data associated with a user or an indication of how much value the user generates for an organization.

FIG. 3B illustrates a diagram of a component 330 for determining the cumulative value 335 of a data at an organization, according to an example of the present disclosure. As shown in FIG. 3B, the cumulative value 335 of data at an organization can be determined by summing (e.g., using summing component 345) the user values 340 (e.g., the cumulative value of data associated with each user or personnel at an organization) and scaling the sum using scaling component 350. In some examples the scaling component 350 can be omitted or may have a unity scaling value. The cumulative value 335 can provide an indication of the total value of data generated or managed by an organization.

Figure 4:
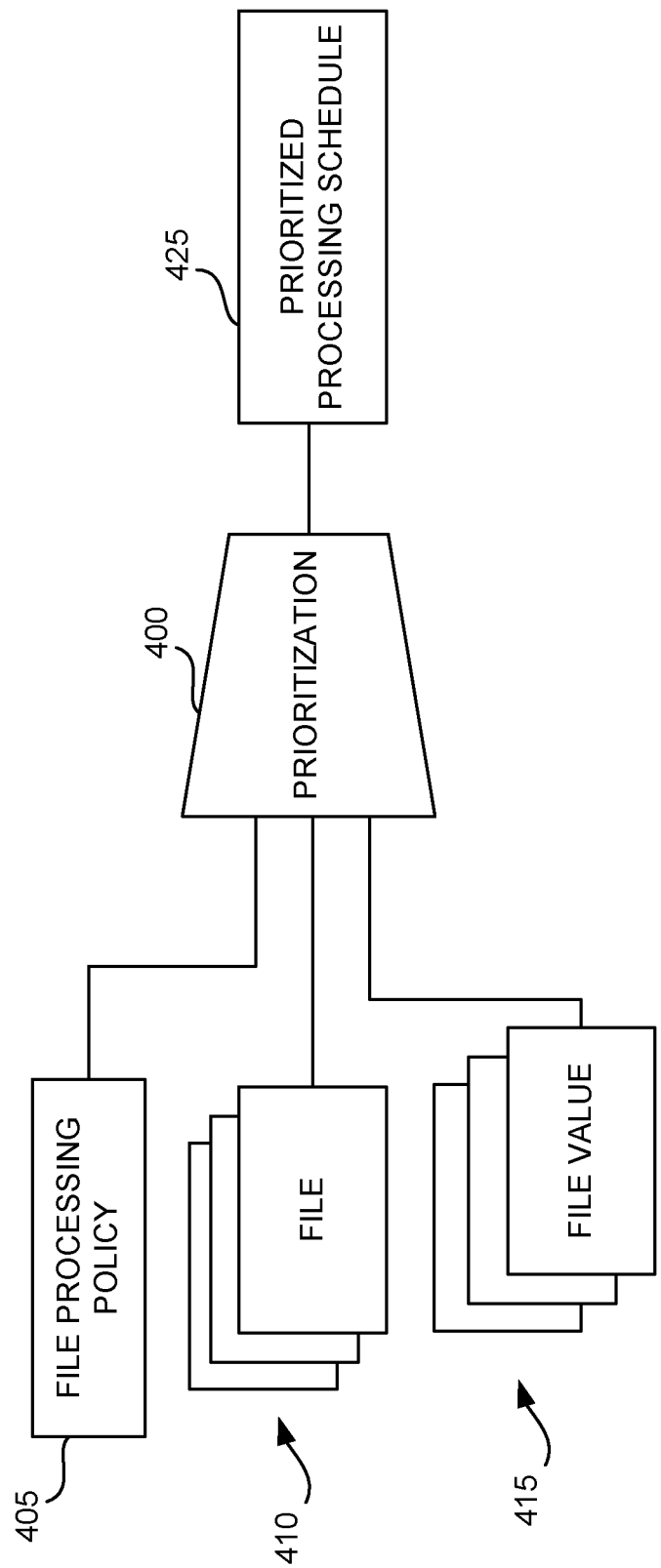
FIG. 4 illustrates a diagram of a component for adjusting or prioritizing the processing of files based on automatically determined file values of the files, according to an example of the present disclosure.

FIG. 4 illustrates a diagram of a prioritization component 400 for adjusting or prioritizing the processing of files based on automatically determined file values of the files, according to an example of the present disclosure. In an example, the prioritization component 400 is a component of the backup client 125, the file processing component 130, or any other suitable component of the system 100. The prioritization component 400 can access file processing policy 405, files 410, and file value database 415. File processing policy 405 can include a data structure having data that is indicative of one or more rules (e.g., organization specific rules) for prioritizing file processing based on file value. In an example, the file processing policy 405 includes a rule indicating that files should be ranked for processing according to a descending order of file value, such that files that have the highest value are processed before files having lower values. In an example, the file processing policy 405 include a rule indicating that, responsive to the occurrence of an event (e.g., a detected or anticipated power or battery failure), files having a value below a threshold value should not be processed or that files having a value above a threshold value should be processed immediately. The prioritization component 400 can include one or more ranking, sorting, or scheduling circuits or applications for using the file processing policy 405 and file values 415 to generate a ranked or prioritized processing schedule 425 for processing the files 410. The prioritized processing schedule 425 can include a data structure comprising an ordered listing identifiers of the files 410. The prioritized processing schedule 425 can be used, such as by backup client 125 or the file processing component 130 to determine a processing order for the files 410 or to process the files 410 according the ordered listing.

Figure 5:
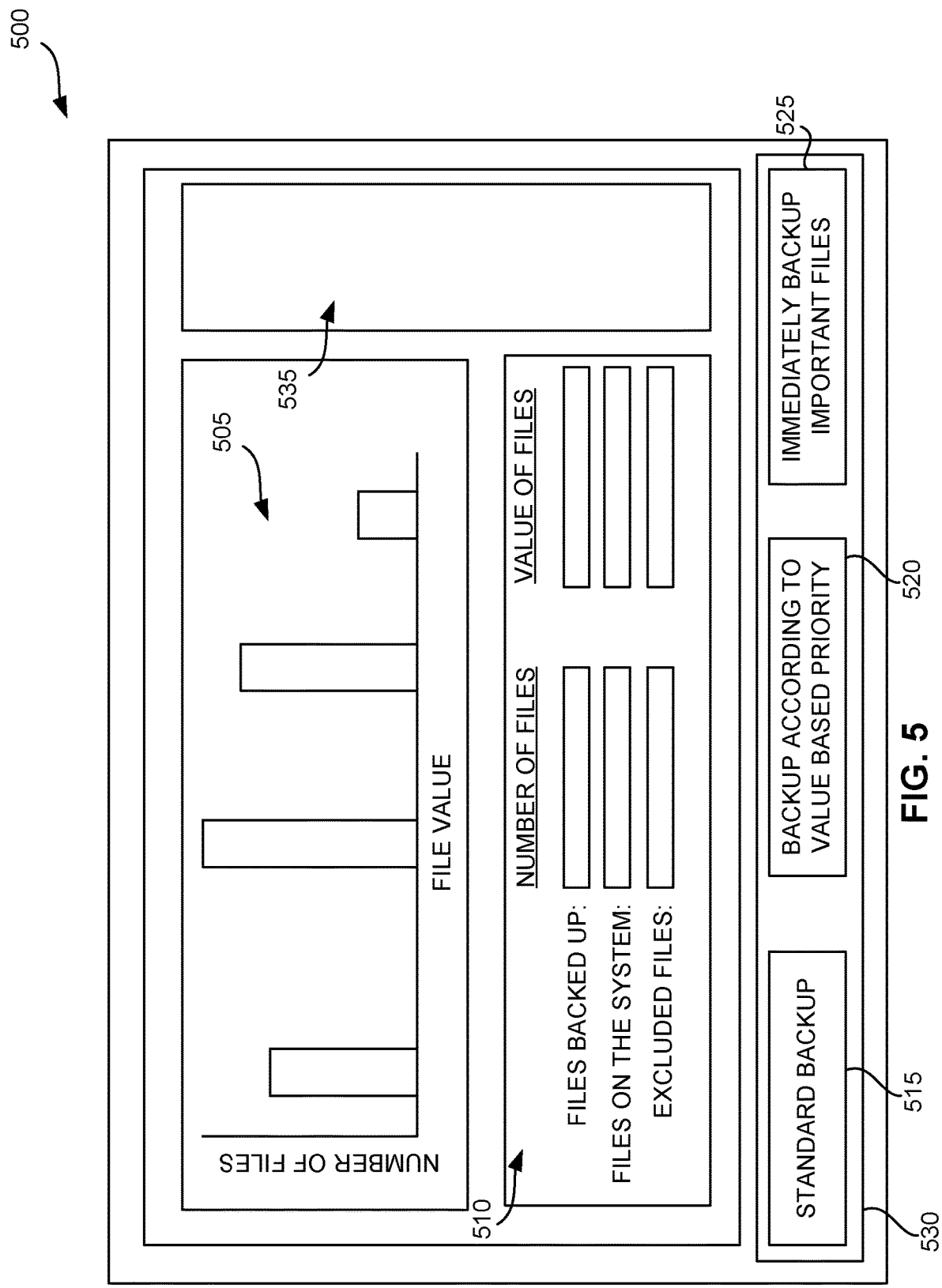
FIG. 5 illustrates a diagram of a user interface of an application for processing files using automatically determined file values of the files, according to an example of the present disclosure.

FIG. 5 illustrates a diagram of a user interface 500 of an application for processing files using automatically determined file values of the files, according to an example of the present disclosure. In an example, the user interface 500 is a user interfaced generated by the backup client 125, the file processing component 130, or any other component of the system 100 that is configured to process, or to provide information associated with the processing of, files using automatically determined file values.

As shown in FIG. 5, the user interface 500 can include a graphical reporting area 505, a summary area 510 and a control area 530. The graphical reporting area 505 can display or render graphs or plots that are indicative of the distribution file value in a corporation. In an example, the plots illustrate how value is distributed across files associated with a corporation (e.g., a categorical plot showing the number of files in each of one or more value buckets). In another example, the plots can illustrate how value is distributed across users of the organization (e.g., a plot of users vs. file value). In another example, the plots can illustrate how value is distributed over time (e.g., a plot of time vs. file value). In another example, the plots can illustrate how value is distributed throughout a file processing operation (e.g., a plot of processing time vs. the value of files processed).

The summary area 510 can include on or more fields or records that provide summary or statistical information about files processed, files pending processing, files excluded from processing, or similar file processing related category. The summary area 510 can also include one or more fields or records that provide summary or statistical information about the file value of such files.

The control area control area 530 can include one or more controls for controlling an application to adjust, schedule, or initiate the processing of files based on the file value of the files. In an example, the control area includes a first control 515 for controlling an application to process files without consideration to file value. In an example, the "standard backup" control controls an application to perform a file backup operation without consideration to file value. In another example, the control area includes a second control 520 for controlling an application to process files with consideration to file value. In an example, the "backup according to a value-based priority" control controls an application to perform a file backup operation according to a file value-based priority schedule, such as generated by prioritization component 400. In yet another example, the control area includes a third control 525 for controlling an application to initiate processing of files having a specified value, such as outside of a scheduled processing operation. In an example, the "immediately backup my important files" control controls an application to perform a file backup operation to immediately backup files having a specified value.

The user interface 500 an have one or more other areas 535, such as a for providing further reporting or for enabling further control of value-based file processing operations.

Figure 6:
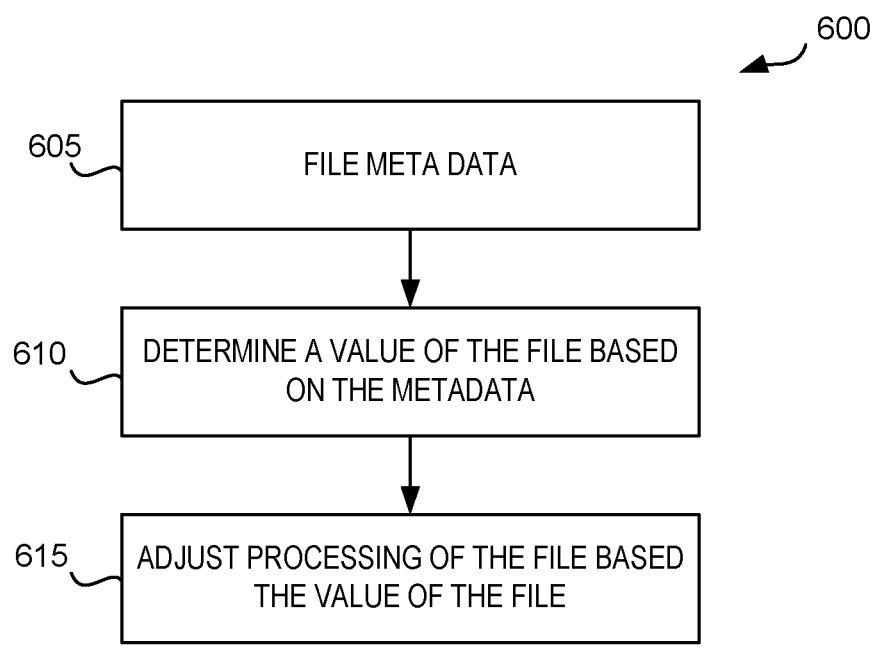
FIG. 6 illustrates an example of a process for processing files based on automatically determined file values of the files, according an example of the present disclosure.

FIG. 6 illustrates an example of a process 600 for processing files based on an automatically determined file values of the files, according an example of the present disclosure. The process 600 can be implemented by any suitable component of the system 100 (FIG. 1). In an example, the process 600 is implemented or executed by the file value determination component 135. At 605, file metadata(e.g., the number of times a file is read, the number of times a file is changed or is modified, the size of the file, the file type of the file, or the file name of the file), such as for one or more files, can be obtained, such as from the backup system 140. In an example, the file metadata is obtained by generating a query language query requesting the file metadata and transmitting the query over data communication network using a network (e.g., client-server) backup system interface to the query service 150. The requested file metadata can be received from the backup system and preprocessed (e.g., filtered) according one or more organization provided rules. At 610 the value of each file can be determined based on the received file metadata, such as described in the discussion of FIGS. 1, 2, 3A, and 3B. At 615, processing of the files, such as backing up the files, can be adjusted based on the determined values of the files. Such adjusting can include modifying a prioritization schedule for processing one or more of the files based on the value of the one or more files relative to other files.

Figure 7:
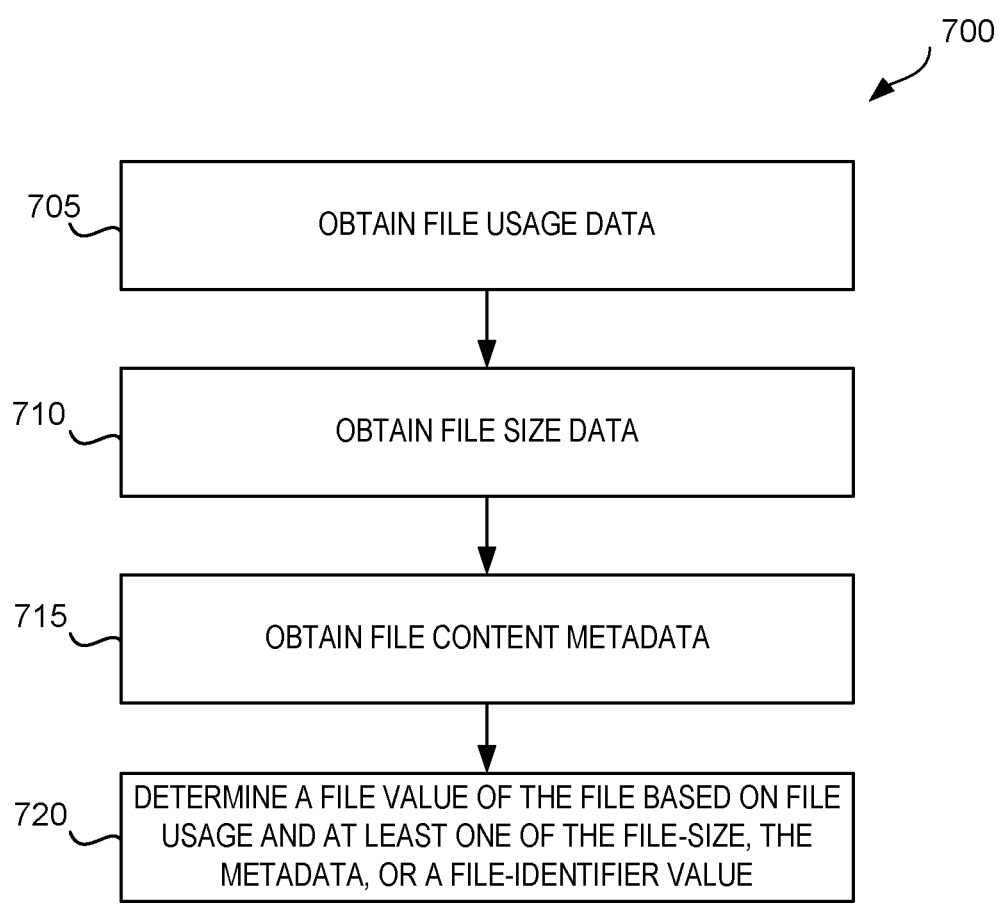
FIG. 7 illustrates an example of a process for automated determination of a file value of a file, according an example of the present disclosure.

FIG. 7 illustrates an example of a process 700 for automated determination of a file value of a file, according an example of the present disclosure. The process 700 can be implemented using any suitable component of the system 100 (FIG. 1). In an example, the process 700 is implemented or executed by the file value determination component 135 or by any other suitable computing resource (hereinafter collectively, "computing system").

At 705 file usage data is obtained, such as from an operating system of a computing resource associated with an organization. In an example, the file usage data includes information that is indicative of the number of times the file is at least partially loaded into the memory of the computing system. The file usage data can include at least one of a first value that is indicative of a number of times that the file is loaded into the memory of the computing system for reading or a second value that is indicative of a number of times that the file is loaded into the memory of the computing system for writing.

At 710, file size data that is indicative of the size of the file is obtained. In an example, the file size data is a numeric value indicating the size of the file in computer memory units, such as bytes.

At 715, file content metadata is obtained. The file content metadata can include data that is indicate of the contents of the file. In an example, the file content metadata includes a numeric value that is indicative of a MIME type of the file. A small numerical value for this data can indicate that a specified MIME type is associated with low value data (e.g., zero), while a large numerical value (e.g., 1 on a normalized scale of 100 other scales) can indicate that a specified MIME type is associated with high value data.

At 720, the file value of the file can be determined based on the file usage and at least one of the file-size, the file content metadata, or a file-identifier value that is derived from an identifier of the file. The determined file value can provide of a quantitative or qualitative indicator of the importance or value of the file. In an example, the quantitative or qualitative indicator is indicative of at least one of a monetary value of the file, a utility of the file, a security value of the file, or a strategic value of the file.

Determining the file value can include causing the computing system, or a processor of the computing system, to evaluate a model represent a weighted combination of numeric valued metadata components comprising the file-size data, the content metadata, the file-identifier value, and a third value derived from at least one of the first value or the second value. Determining the file value can also include causing the computing system to weight one or more term of the model by at least one of the file content metadata or one or more specified weights, such as shown in equation (1).

The process 720 can also include adjusting processing of the file relative to the processing of other files associated with the computing system based on the file value. Such adjusting can include causing the computing system to adjust a priority for processing the file relative to a priority for processing other files based on the file value for the file and file values of the other files. In an example, such adjusting includes adjusting a priority for backing up or restoring the file relative to a priority for backing up or restoring the other files. In another example, such adjusting includes adjust a presentation of a record associated with the file in a report of files associated with the computing system.

Figure 8:
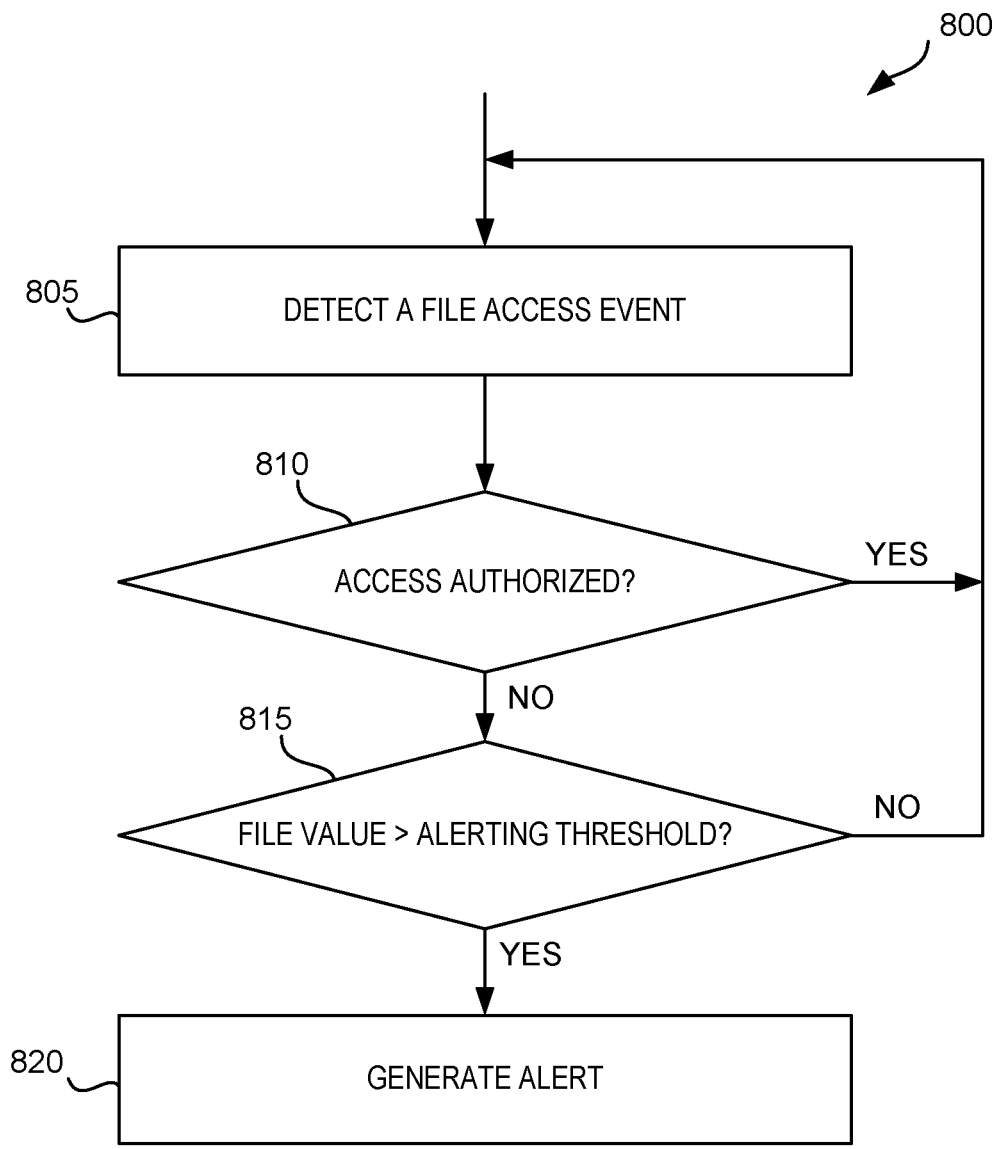
FIG. 8 illustrates an example of a process for selectively generating file access alerts using automatically determined file values of a file, according an example of the present disclosure.

FIG. 8 illustrates an example of a process 800 for selectively generating file access alerts using automatically determined file values of files, according an example of the present disclosure. The process 800 can be implemented by any of the components of the system 100 (hereinafter collectively, "system"). At 805, the system detects a file access event, such as an operation to read, modify, copy, transfer, or delete a file. At 810, the system determines whether the file access event is authorized, such as according to a security policy of the system or an organization associated with the system. The process 800 can return to step 805 when the access is authorized. The processing 800 can continue to 815 when the access is not authorized. At 815, the system can determine whether the file value of the file is greater than a threshold file value. The process 800 can return to step 805 when the file value is not greater than the threshold file value. The process 800 can continue to 820 when the file value is greater than the threshold file value. At 820, the system can generate a file access alert, such as a security breach notification or report.

Figure 9:
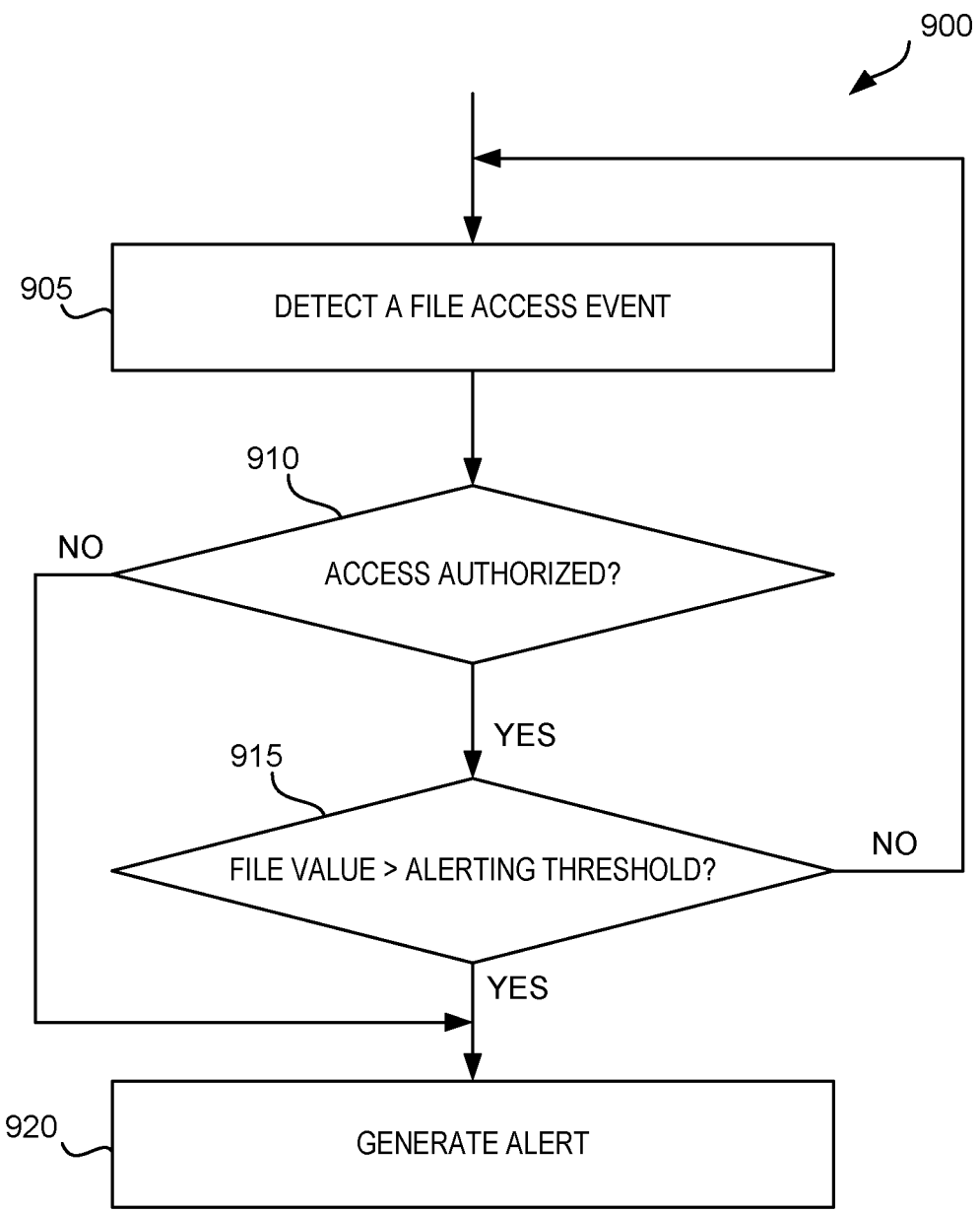
FIG. 9 illustrates an example of a process for selectively generating file access alerts using automatically determined a file value a file, according an example of the present disclosure.

FIG. 9 illustrates an example of a process 900 for selectively generating file access alerts using automatically determined file values of files, according an example of the present disclosure. The process 900 can be implemented by any of the components of the system 100 (hereinafter collectively, "system"). At 905, the system detects a file access event, such as an operation to read, modify, copy, transfer, or delete a file. At 910, the system determines whether the file access event is authorized, such as according to a security policy of the system or an organization associated with the system. The process 900 can proceed to step 920 when the access is not authorized. The processing 900 can continue to 915 when the access is authorized. At 915, the computing system can determine whether the file value of the file value is greater than a threshold file value (e.g., an alerting threshold). The process 900 can return to step 905 when the file value is not greater than the threshold file value. The processing 900 can continue to 920 when the file value is greater than the threshold file value. At 920, the computing system can generate an alert, such as a security breach notification or report.

The processes described in the discussion FIGS. 6-9 can include any other steps or operations for implementing the techniques described herein.

While the operations processes described in the discussion FIGS. 6-9 are shown as happening sequentially in a specific order, in other examples, one or more of the operations may be performed in parallel or in a different order. Additionally, one or more operations may be repeated two or more times.

Figure 10:
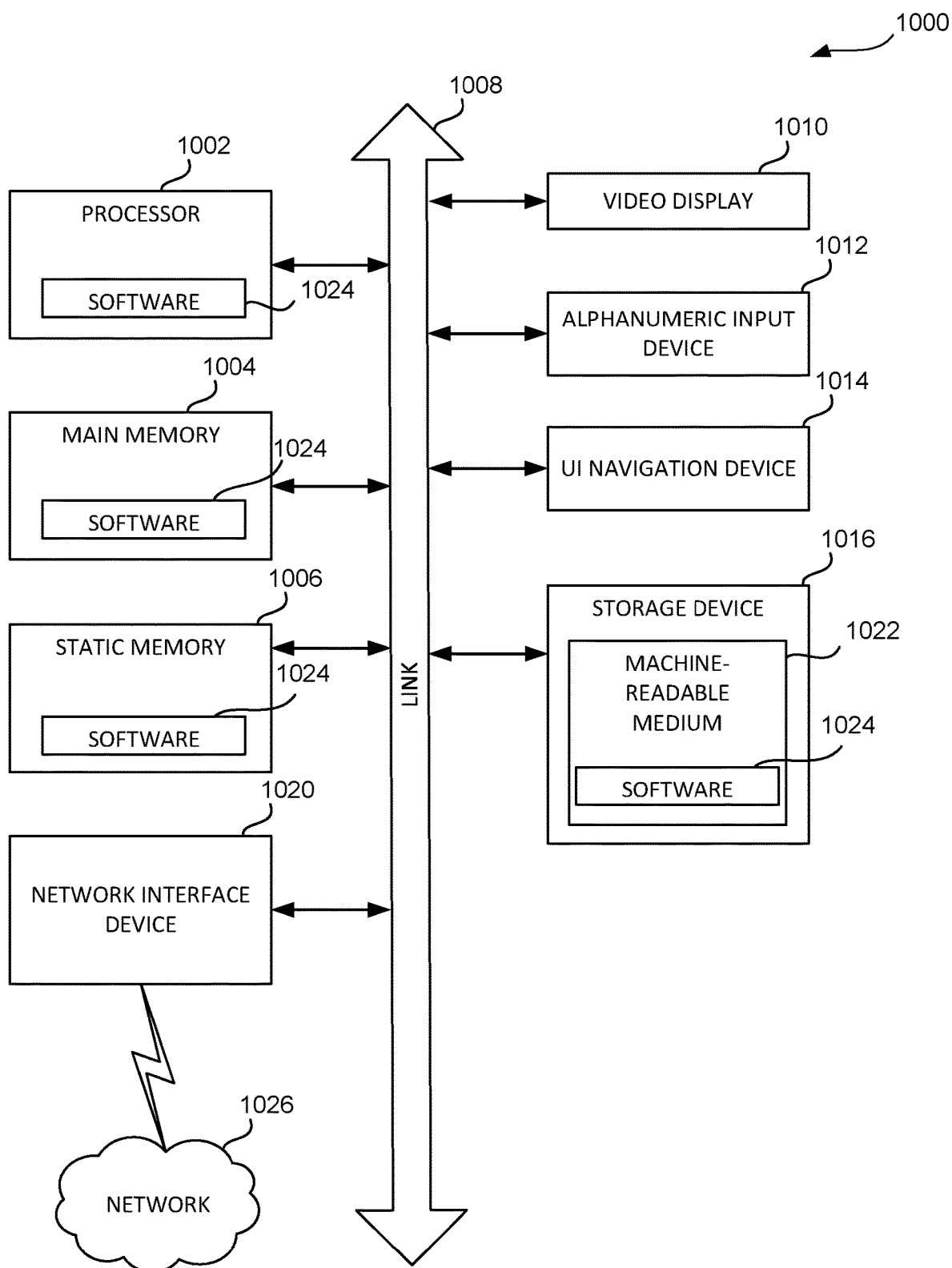
FIG. 10 illustrates a diagrammatic representation of a machine in the form of a computer system within which a set of instructions may be executed for causing the machine to perform any one or more of the methodologies discussed herein, according to an example of the present disclosure.

FIG. 10 illustrates a diagrammatic representation of a machine in the form of a computer system within which a set of instructions may be executed for causing the machine to perform any one or more of the methodologies discussed herein, according to an example of the present disclosure. The computer system 1000 is an example of one or more of the computing resources discussed herein.

In alternative examples, the machine operates as a stand-alone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a vehicle subsystem, a personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1000 includes at least one processor 1002 (e.g., a central processing unit (CPU), a graphics processing unit (GPU) or both, processor cores, compute nodes, etc.), a main memory 1004 and a static memory 1006, which communicate with each other via a link 1008 (e.g., bus). The computer system 1000 may further include a video display unit 1010, an alphanumeric input device 1012 (e.g., a keyboard), and a user interface (UI) navigation device 1014 (e.g., a mouse). In one example, the video display unit 1010, input device 1012 and UI navigation device 1014 are incorporated into a touch screen display. The computer system 1000 may additionally include a storage device 1016 (e.g., a drive unit), such as a global positioning system (GPS) sensor, compass, accelerometer, gyrometer, magnetometer, or other sensors.

The storage device 1016 includes a machine-readable medium 1022 on which is stored one or more sets of data structures and instructions 1024 (e.g., software) embodying or utilized by any one or more of the methodologies or functions described herein. In an example, the one or more instructions 1024 can constitute the backup client 125, the file processing component 130, the file value determination component 135, or the reporting element 170 as described herein. The instructions 1024 may also reside, completely or at least partially, within the main memory 1004, static memory 1006, and/or within the processor 1002 during execution thereof by the computer system 1000, with the main memory 1004, static memory 1006, and the processor 1002 also constituting machine-readable media.

While the machine-readable medium 1022 is illustrated in an example to be a single medium, the term "machine-readable medium" may include a single medium or multiple media (e.g., a centralized or distributed database, and/or associated caches and servers) that store the one or more instructions 1024. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the—readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any example herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

The above detailed description includes references to the accompanying drawings, which form a part of the detailed description. The drawings show, by way of illustration, specific examples that may be practiced. These examples are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other examples may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as examples may feature a subset of said features. Further, examples may include fewer features than those disclosed in a particular example. Thus, the following claims are hereby incorporated into the Detailed Description, with a claim standing on its own as a separate example. The scope of the examples disclosed herein is to be determined with reference to the appended claims, along with the full scope of equivalents to which such claims are entitled.

What is claimed is:

1. A system for processing a file stored on a computing system, the system comprising:
   at least one processor; and
   memory including instructions that, when executed by the at least one processor, cause the at least one processor to perform operations to:
   obtain file usage data that is indicative of a number of times the file is loaded into a memory of the system, wherein the file usage data comprises at least one of a first value that is indicative of a number of times that the file is loaded into the memory of the computing system for reading or a second value that is indicative of a number of times that the file is loaded into the memory of the computing system for writing;
   obtain file-size data that is indicative of a size the file;
   obtain metadata that is indicative of contents the file;
   determine a file value based on the file usage data, the file-size data, the metadata, and a file-identifier value that is derived from an identifier of the file, the file value comprising a quantitative or qualitative indicator of a value of the file; and
   adjust processing of the file relative to processing of other files associated with the computing system based on the file value.

2. The system of claim 1, wherein the instructions to determine the file value further comprises instructions that, when executed by the at least one processor, cause the at least one processor to perform operations to evaluate a linear combination comprising the file-size data, the metadata, the file-identifier value, and a third value derived from at least one of the first value or the second value.

3. The system of claim 2, wherein the instructions to determine the file value further comprises instructions that, when executed by the at least one processor, cause the at least one processor to perform operations to weight each term of the linear combination by at least one of the metadata or one or more specified weights.

4. The system of claim 1, wherein the metadata comprises a data value that is indicative of file-type of the file.

5. The system of claim 1, wherein the file-identifier value comprises a count of words in a file-identifier of the file.

6. The system of claim 1, wherein the instructions to adjust processing of the file relative to processing of other files based on the file value further comprises instructions that, when executed by the at least one processor, cause the at least one processor to perform operations to adjust a priority for processing the file relative to a priority for processing the other files based on the file value and file values of the other files.

7. The system of claim 6, wherein the instructions to adjust the priority for processing the file relative to the priority for processing the other files further comprises instructions that, when executed by the at least one processor, cause the at least one processor to perform operations to adjust a priority for backing up or restoring the file relative to a priority for backing up or restoring the other files.

8. The system of claim 1, wherein the instructions to adjust processing of the file relative to processing of other files based on the file value further comprises instructions that, when executed by the at least one processor, cause the at least one processor to perform operations to adjust a presentation of a record associated with the file in a report of files associated with the computing system, the record comprising the file value.

9. The system of claim 1, wherein the quantitative or qualitative indicator is indicative of at least one of:
 a monetary value of the file;
 a utility of the file;
 a security value of the file; or
 a strategic value of the file.

10. The system of claim 1, wherein the instructions to adjust processing of the file relative to processing of other files based on the file value further comprises instructions that, when executed by the at least one processor, cause the at least one processor to perform operations to:
 detect an operation to access the file;
 determine that the operation is unauthorized;
 determine that the file value exceeds a threshold file value; and
 generating, determine that the file value exceeds a threshold file value, an alert or a report comprising informant that is indicative of the operation to access the file.

11. The system of claim 1, wherein the instructions to adjust processing of the file relative to processing of other files based on the file value further comprises instructions that, when executed by the at least one processor, cause the at least one processor to perform operations to:
 detect an operation to access the file;
 determine that the operation is authorized;
 determine, responsive to determine that the operation is authorized, that the file value exceeds a threshold file value; and
 generating, determine that the file value exceeds a threshold file value, an alert or a report comprising informant that is indicative of the operation to access the file.

12. A method for processing a file stored on a computing system, the method comprising:
 obtaining file usage data that is indicative of a number of times the file is loaded into a memory of the computing system, wherein the file usage data comprises at least one of a first value that is indicative of a number of times that the file is loaded into the memory of the computing system for reading or a second value that is indicative of a number of times that the file is loaded into the memory of the computing system for writing;
 obtaining file-size data that is indicative of a size the file;
 obtaining metadata that is indicative of contents the file;
 determining a file value based on the file usage data, the file-size data, the metadata, and a file-identifier value that is derived from an identifier of the file, the file value comprising a quantitative or qualitative indicator of a value of the file; and
 adjusting processing of the file relative to processing of other files associated with the computing system based on the file value.

13. The method of claim 12, wherein determining the file value comprises evaluating a linear combination comprising the file-size data, the metadata, the file-identifier value, and a third value derived from at least one of the first value or the second value, wherein a term of the linear combination is weighted by at least one of the metadata or one or more specified weights.

14. The method of claim 12, wherein adjusting processing of the file relative to processing of other files based on the file value comprises adjusting a priority for processing the file relative to a priority for processing the other files based on the file value and file values of the other files.

15. The method of claim 12, wherein adjusting processing of the file relative to processing of other files based on the file value comprises adjusting a presentation of a record associated with the file in a report of files associated with the computing system, the record comprising the file value.

16. A non-transitory machine-readable medium comprising instructions, which when executed by a machine, causes the machine to perform a method comprising:
 obtaining file usage data that is indicative of a number of times a file is loaded into a memory of a computing system, wherein the file usage data comprises at least one of a first value that is indicative of a number of times that the file is loaded into the memory of the computing system for reading or a second value that is indicative of a number of times that the file is loaded into the memory of the computing system for writing;
 obtaining file-size data that is indicative of a size the file;
 obtaining metadata that is indicative of contents the file;
 determining a file value based on the file usage data, the file-size data, the metadata, and a file-identifier value that is derived from an identifier of the file, the file value comprising a quantitative or qualitative indicator of a value of the file; and
 adjusting processing of the file relative to processing of other files associated with the computing system based on the file value.

17. The non-transitory machine-readable medium of claim 16, wherein determining the file value comprises evaluating a linear combination comprising the file-size data, the metadata, the file-identifier value, and a third value derived from at least one of a first value or a second value, wherein a term of the linear combination is weighted by at least one of the metadata or one or more specified weights.

18. Non-transitory machine-readable medium of claim 16, wherein adjusting processing of the file relative to processing of other files based on the file value comprises adjusting a priority for processing the file relative to at least one of a priority for processing the other files based on the file value and file values of the other files.

* * * * *